(12) United States Patent (10) Patent No.: US 8,523,193 B1
Mucaro et al. (45) Date of Patent: Sep. 3, 2013

(54) CONVERTIBLE RIDE-ON AND PULL WAGON TOY

(75) Inventors: Damian Mucaro, Hackensack, NJ (US); Zachary J. Durren, Butler, NJ (US); Ron Lokos, Roseland, NJ (US)

(73) Assignee: JAKKS Pacific, Inc., Malibu, CA (US)

( * ) Notice: Subject to any disclaimer, the term of this patent is extended or adjusted under 35 U.S.C. 154(b) by 0 days.

(21) Appl. No.: 13/557,119

(22) Filed: Jul. 24, 2012

(51) Int. Cl.
*A63C 17/18* (2006.01)

(52) U.S. Cl.
USPC ........................................... 280/7.15

(58) Field of Classification Search
USPC ........ 280/827–828, 1.23, 7.1, 7.15, 647–648, 280/650–651, 655–658, 87.01, 87.021, 87.05, 280/47.18, 47.25, 47.3
See application file for complete search history.

(56) References Cited

U.S. PATENT DOCUMENTS

| | | | |
|---|---|---|---|
| 5,383,808 A | 1/1995 | DuBois | |
| 5,441,289 A | 8/1995 | Spielberger | |
| 5,474,483 A * | 12/1995 | Sun | 446/71 |
| 5,538,267 A | 7/1996 | Pasin et al. | |
| 6,089,586 A | 7/2000 | Rudell et al. | |
| 6,161,847 A | 12/2000 | Howell et al. | |
| 6,296,268 B1 | 10/2001 | Ford et al. | |
| 6,508,344 B1 * | 1/2003 | Lu | 190/115 |
| 6,932,365 B2 | 8/2005 | Chiappetta et al. | |
| 7,222,866 B1 * | 5/2007 | Cahoj et al. | 280/33.991 |
| D631,102 S * | 1/2011 | Jessie, Jr. | D21/424 |

* cited by examiner

*Primary Examiner* — John Walters
*Assistant Examiner* — James Triggs
(74) *Attorney, Agent, or Firm* — Tope-McKay & Associates (57) ABSTRACT

Described is a convertible ride-on and pull wagon toy. The toy wagon includes a wagon body having a compartment therein for storage. A plurality of wheels are rotatably connected with the wagon body for supporting the wagon body on a ground surface. An elongated seat member having a wagon end and a handle end is attached with the wagon body such that the wagon end is pivotally connected with the wagon body. A handle is connected with the handle end of the elongated seat member. The elongated seat member is pivotally attached to the wagon body to rotate between a ride-on configuration, where the elongated seat member covers the compartment and operates as a seat (and can be selectively locked in place with a lock mechanism), and a pull wagon configuration, where the elongated seat member extends from the wagon and serves as a neck for the handle.

2 Claims, 6 Drawing Sheets

CONVERTIBLE RIDE-ON AND PULL WAGON TOY

BACKGROUND OF THE INVENTION (1) Field of Invention

The present invention relates to a convertible toy and, more particularly, to a convertible toy that converts between a pull wagon and a ride-on toy.

(2) Description of Related Art

Pull wagons have long been known in the art and have largely been popularized by the Radio Flyer, little red wagon. The Radio Flyer wagon has been used by countless children to store and haul a variety of items. The traditional Radio Flyer red wagon includes a wagon body, four wheels, and a tow handle. While operable for towing a variety of items, the traditional wagon is unsuitable for riding on or providing any convertible features.

Thus, as an improvement over the traditional wagon, wagons have been devised to include a variety of convertible features. By way of example, Radio Flyer, Inc. devised the Convertible Wagon, which it patented as U.S. Pat. No. 6,932,365 (the '365 patent). The '365 patent describes a convertible wagon that includes seating surfaces in the storage compartment of the wagon. Fold down seatbacks are attached to the wagon body to allow the wagon to convert between a ride-in wagon and a tow wagon.

In a different but somewhat related art, walker devices have long been used by toddlers or infants when learning how to walk. The walker is typically a toy that a young child can push and walk behind and, in doing so, practice learn how, to walk with assistance from the walker. Improvements over traditional walkers have been directed to convertible walker/riders. For example, U.S. Pat. No. 6,296,268 (the '268 patent), disclosed a convertible to that can be used alternatively as a foot-to-floor ride-on vehicle or as a walker.

As evident above, there have been a variety of convertible toys that are directed to the ride-on concept. However, nothing heretofore devised was directed to a convertible pull wagon that transitions from an exclusive pull wagon to a ride-on toy. Thus, a continuing need exists for such a convertible ride-on and pull wagon toy.

SUMMARY OF INVENTION

The present invention relates to a convertible toy and, more particularly, to a convertible toy that converts between a pull wagon and a ride-on toy (i.e., toy wagon). The toy wagon includes a wagon body having a compartment therein for storage. A plurality of wheels are rotatably connected with the wagon body for supporting the wagon body on a ground surface. An elongated seat member having a wagon end and a handle end is attached with the wagon body such that the wagon end is pivotally connected with the wagon body. A handle is pivotally connected with the handle end of the elongated seat, member. The elongated seat member is pivotally attached to the wagon body such that the elongated seat member may be rotated between a ride-on configuration, where the elongated seat member covers the compartment and operates as a seat, and a pull wagon configuration, where the elongated seat member extends from the wagon and serves as a neck for the handle. Through positioning the elongated seat member, a user can selectively convert the ride-on and pull wagon toy between the ride-on configuration and pull wagon configuration.

In another aspect, when the elongated seat member is in the ride-on configuration, the handle pivots up to a ride-on handle position and operates as a ride-on handle, and when the elongated seat member is in the pull wagon configuration, the handle pivots away from the wagon body to operate as a pull wagon handle.

In yet another aspect, a locking mechanism is included to lock the elongated seat member in the ride-on configuration. The locking mechanism includes a pivot member that is pivotally connected with the wagon body. The pivot member includes a catch and a handle release. Alternatively, the handle includes a catch indentation adapted to lock with the catch. Thus, when the elongated seat member is rotated into the ride-on configuration, the handle comes to rest against the wagon body and, in doing so, the catch slides into and locks into place with the catch indentation.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a convertible toy and, more particularly, to a convertible toy that converts between a pull wagon and a ride-on toy. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or Similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, rear, top, bottom, forward, reverse, clockwise and counter clockwise have been used for convenience purposes only and are not intended to imply any particular fixed direction. Instead, they are used to for convenience purposes only to reflect relative locations and/or directions between various portions of an object.

(1) DESCRIPTION

Figure 1A:
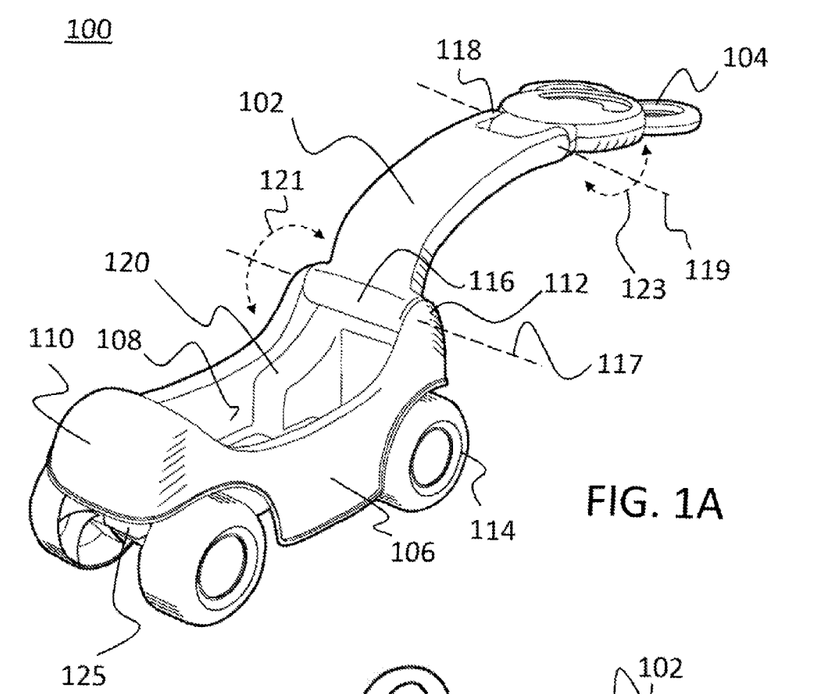
FIG. 1A is a perspective-view illustration of a convertible ride-on and pull wagon toy according to the present invention, depicting the toy in a pull wagon configuration.
Figure 1B:
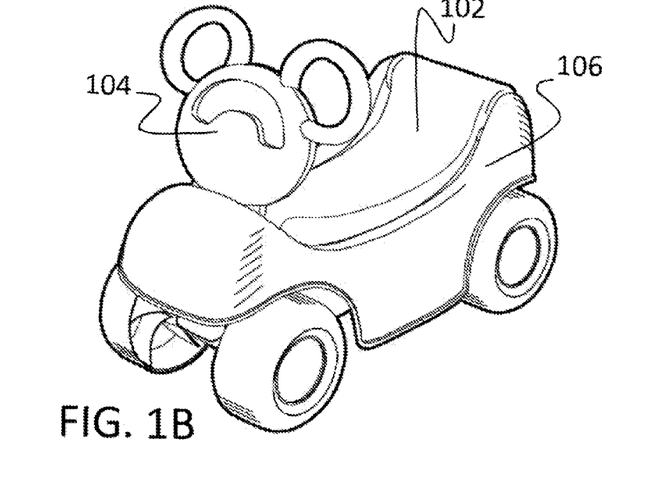
FIG. 1B is a perspective-view illustration of a convertible ride-on and pull wagon toy according to the present invention, depicting the toy in a ride-on configuration.

The present invention is directed to a convertible ride-on and pull wagon toy (i.e., toy wagon). Simply stated and as depicted in FIGS. 1A and 1B, the toy wagon 100 includes an elongated seat member 102 and corresponding handle 104 that can be moved between a first position (where it can be used as a handle to pull the wagon, as shown in FIG. 1A) and a second position (where it can be used as a bench to sit upon, as shown in FIG. 1B). The specific details with respect to the convertible ride-on and pull wagon toy (i.e., toy wagon) are provided below.

As shown in FIG. 1A, the toy wagon 100 includes a wagon body 106. The wagon body 106 is formed in any suitable manner to accommodate the elongated seat member 102. As a non-limiting example, the wagon body 106 is formed with a compartment 108 therein and surrounding walls, including a front portion 110 and rear portion 112. The compartment 108 can be used for storage or otherwise to allow a child or user to position items therein. A plurality of wheels 114 (e.g., 4 or any suitable number) are rotatably connected with the wagon body 106 for supporting the wagon body 106 on a ground surface. The wheels 114 are rotatably connected with the wagon body 106 using any suitable mechanism, device, or technique. As a non-limiting example, the wheels 114 are affixed with the wagon body 106 via an axle that passes through a bottom portion of the wagon body 106. It should be noted that the components described herein can be formed of any suitable material, non-limiting examples of which include plastic and metal.

The wagon body 106 is formed in any suitable manner to support the elongated seat member 102 when in the ride-on configuration (as shown in FIG. 1B). As a non-limiting example, the surrounding walls of the compartment 108 can be formed to include ledges 120 that support the elongated seat member 102. In other words, when the elongated seat member 102 is folded over the compartment 108, the ledges 120 maintain the elongated seat member 102 in a suitable position for a child to sit thereon.

The elongated seat member 102 includes a wagon end 116 and a handle end 118. The elongated seat member 102 is attached with the wagon body 106 such that the wagon end 116 is pivotally connected (via an axle, pin, protrusions or any other suitable mechanism or device) with the wagon body 106 to pivot about a seat member axis 117. Additionally, the handle 104 is pivotally connected (via an axle, pin, protrusions or any other suitable mechanism or device) with the handle end 118 of the elongated seat member 102 such that it can pivot about a handle axis 119.

Thus, the elongated seat member 102 is pivotally attached to the wagon body 106 such that it may be rotated 121 between a ride-on position (as shown in FIG. 1B) where the elongated seat member 102 covers the compartment and operates as a seat, and a pull wagon position (as shown in FIG. 1A), where the elongated seat member 102 extends from the wagon body 106 and serves as a neck for the handle 104.

Additionally, when the elongated seat member 102 is in the ride-on position (as shown in FIG. 1B), the handle 104 can be pivoted 123 to a ride-on handle position and operates as a ride-on handle. When in the ride-on handle position, the handle 104 is locked in place via a locking mechanism (described in further detail below). Alternatively, when the handle 104 is released from the locking mechanism using a handle release 125, the elongated seat member 102 can be pivoted 121 upward toward the pull wagon position. In this aspect, when the elongated seat member 102 is in the pull wagon position (as shown in FIG. 1A), the handle 104 pivots 123 away from the wagon body 106 to operate as a pull wagon handle.

Figure 2:
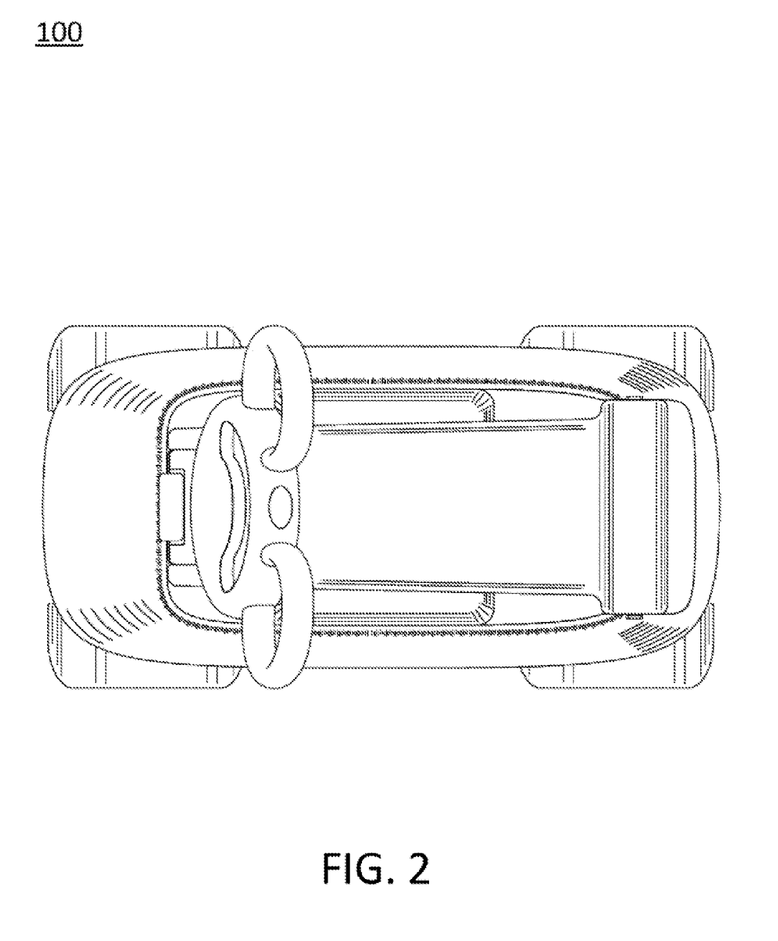
FIG. 2 is a top-view illustration of a convertible ride-on and pull wagon toy according to the present invention, depicting the toy in a ride-on configuration.
Figure 3A:
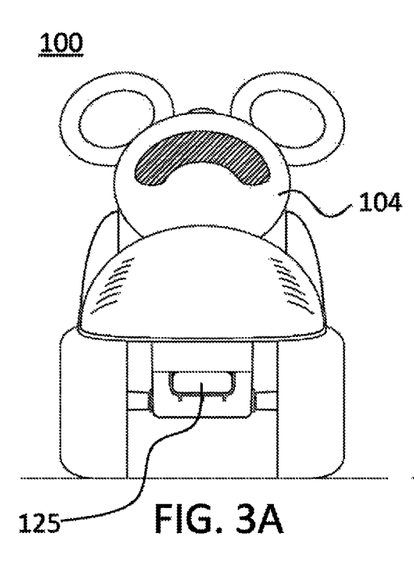
FIG. 3A is a front-view illustration of a convertible ride-on and pull wagon toy according to the present invention, depicting the toy in a ride-on configuration.
Figure 3B:
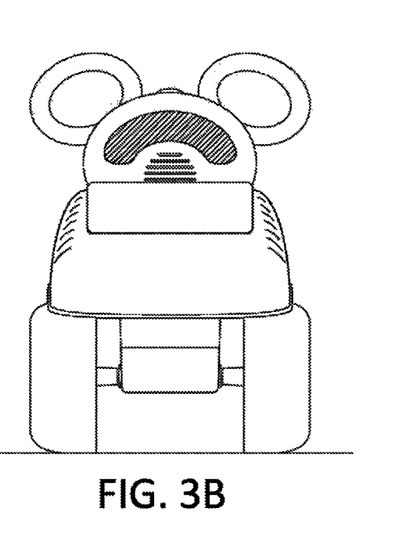
FIG. 3B is a rear-view illustration of a convertible ride-on and pull wagon toy according to the present invention, depicting the toy in a ride-on configuration.
Figure 3C:
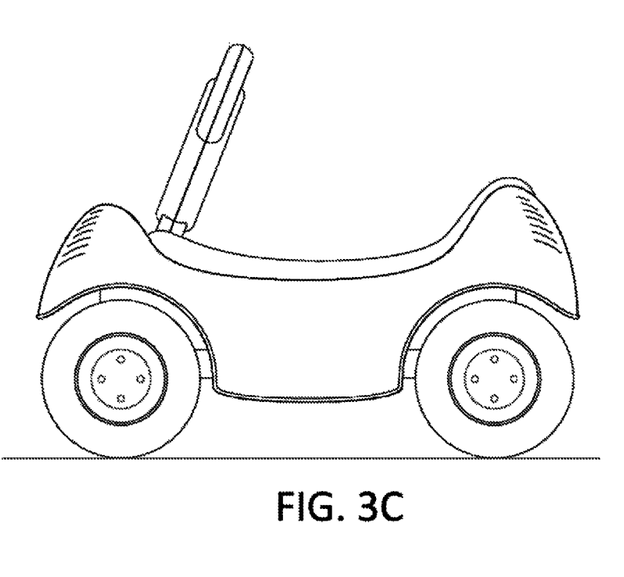
FIG. 3C is a side-view illustration of a convertible ride-on and pull wagon toy according to the present invention, depicting the toy in a ride-on configuration.

FIGS. 2 through 3C provide additional viewpoints of the toy wagon 100 in the ride-on configuration. Specifically, FIGS. 2, 3A, 3B, and 3C are top, front, rear, and side-view illustrations, respectively, of the toy wagon 100. It should be noted that the front-view illustration of FIG. 3A clearly illustrates the handle release 125 that can be used to release the handle 104 from the locking mechanism (as described in further detail below with respect to FIG. 5B).

For further details, FIGS. 4A through 4D provide interior-view illustrations of the toy wagon 100. Specifically, is a side-view illustration of a toy wagon 100 according to the present invention, depicting the toy in a pull wagon configuration. Also depicted are several cross-sectional line-markings for use with the illustrations of FIGS. 4B through 4D.

Figure 4A:
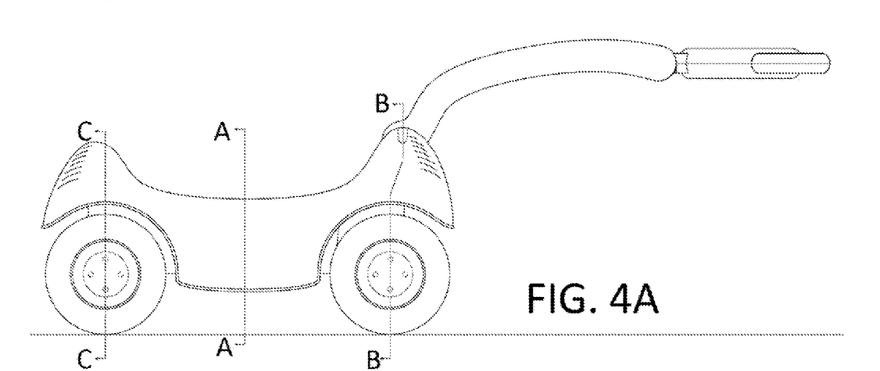
FIG. 4A is a side-view illustration of a convertible ride-on and pull wagon toy according to the present invention, depicting the toy in a pull wagon configuration.
Figure 4B:
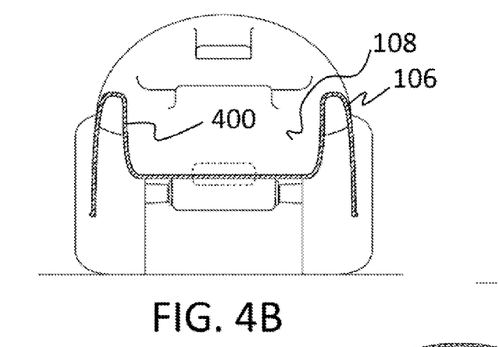
FIG. 4B is a cross-sectional view illustration of a convertible ride-on and pull wagon toy according to the present invention, taken along Section A-A of FIG. 4A.

FIG. 4B is a cross-sectional view illustration of the toy wagon, taken along Section A-A of FIG. 4A. As shown in FIG. 4B, the wagon body 106 includes a compartment 108 therein formed by surrounding walls 400.

Figure 4C:
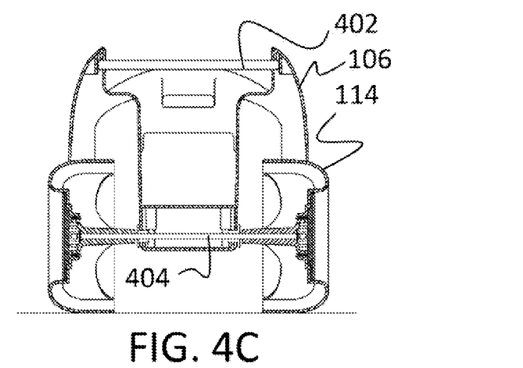
FIG. 4C is a cross-sectional view illustration of a convertible ride-on and pull wagon toy according to the present invention, taken along Section B-B of FIG. 4A.

Alternatively, FIG. 4C is a cross-sectional view illustration of the toy wagon 100, taken along Section B-B of FIG. 4A. As shown, the elongated seat member is pivotally connected with the wagon body 106 via any suitable mechanism, technique, or device, such as an axle member 402 that is connected with the wagon body 106 and passes through the elongated seat member. Further, the wheels 114 are rotatably connected with the wagon body 106 via an axle 404.

Figure 4D:
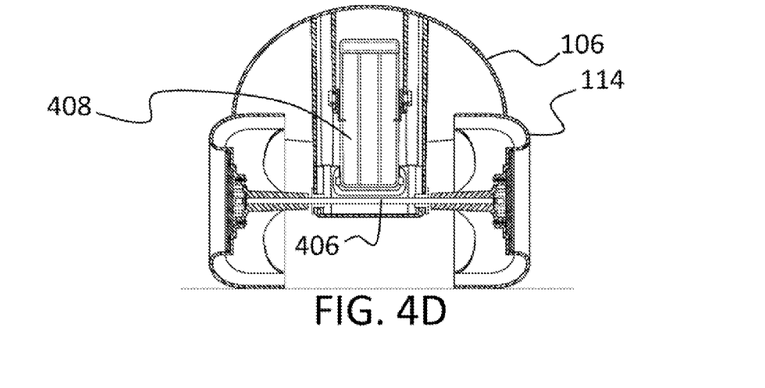
FIG. 4D is a cross-sectional view illustration of a convertible ride-on and pull wagon toy according to the present invention, taken along Section C-C of FIG. 4A.

Finally, FIG. 4D is a cross-sectional view illustration of the toy wagon 100, taken along Section C-C of FIG. 4A. Again, the wheels 114 are rotatably connected with the wagon body 106 via an axle 406. Importantly, FIG. 4D illustrates the locking mechanism 408 that can be used to lock the handle and the elongated seat member in the ride-on configuration. Further details regarding the locking mechanism are provided below with respect to FIG. 5B.

Figure 5A:
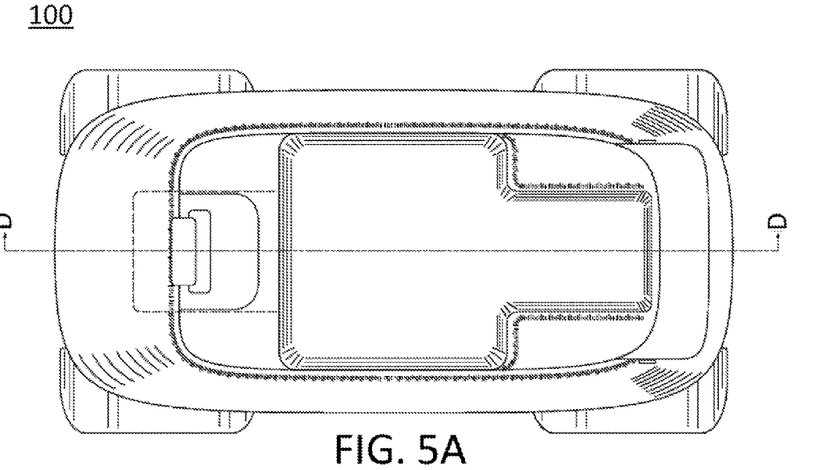
FIG. 5A is a top-view illustration of a convertible ride-on and pull wagon toy according to the present invention, depicting the toy without a handle attached.

FIG. 5A is a top-view illustration of the toy wagon, depicting the toy wagon 100 without a handle or elongated seat member for illustrative purposes. Also depicted is a cross-sectional line-marking for use with the illustration of FIG. 5B.

Figure 5B:
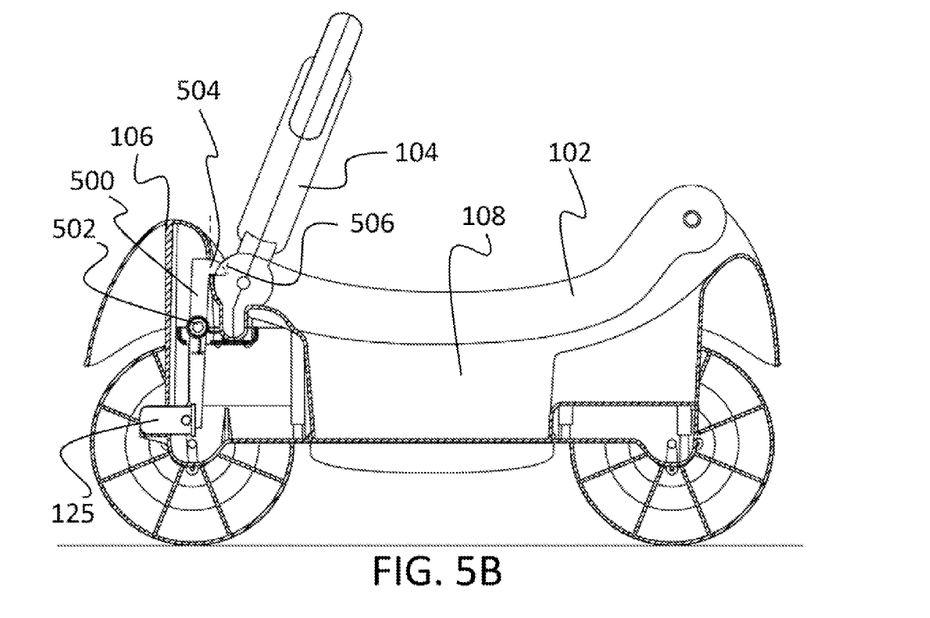
FIG. 5B is a cross-sectional view illustration of a convertible ride-on and pull wagon toy according to the present invention, taken along Section D-D of FIG. 5A.

FIG. 5B is a cross-sectional view illustration of the toy wagon 100, taken along Section D-D of FIG. 5A. As shown, the toy wagon 100 is in the ride-on configuration, with the elongated seat member 102 pivoted such that it covers the compartment 108 and is in a suitable form to allow a child to ride the toy wagon 100. Also depicted in is the locking mechanism. It should be noted that the locking mechanism is any suitable mechanism or device that is operable for locking the handle 104 and elongated seat member 102 in the ride-on configuration. As a non-limiting example, the locking mechanism includes a pivot member 500 that is pivotally connected 502 with the wagon body 106. On a handle end of the pivot member 500 is a catch 504, while on a release end of the pivot member is the handle release 125. To engage or otherwise lock with the catch 504 is a catch indentation 506 that is formed at a base of the handle 104. Thus, when the elongated seat member 102 is rotated into the ride-on configuration (as depicted in FIG. 5B), the base of the handle 104 comes to rest against the wagon body 102 and, in doing so, the catch 504 slides into and locks into place with the catch indentation 506 (i.e., the handle 104 is effectively locked into place). To release the handle 104, a user can simply depress the handle release 125, which causes the pivot member 500 to rotate and withdraw the catch 504 from the catch indentation 506, thereby releasing the handle 104 and allow a user to lift the elongated seat member 102 from the wagon body 106.

Figure 6:
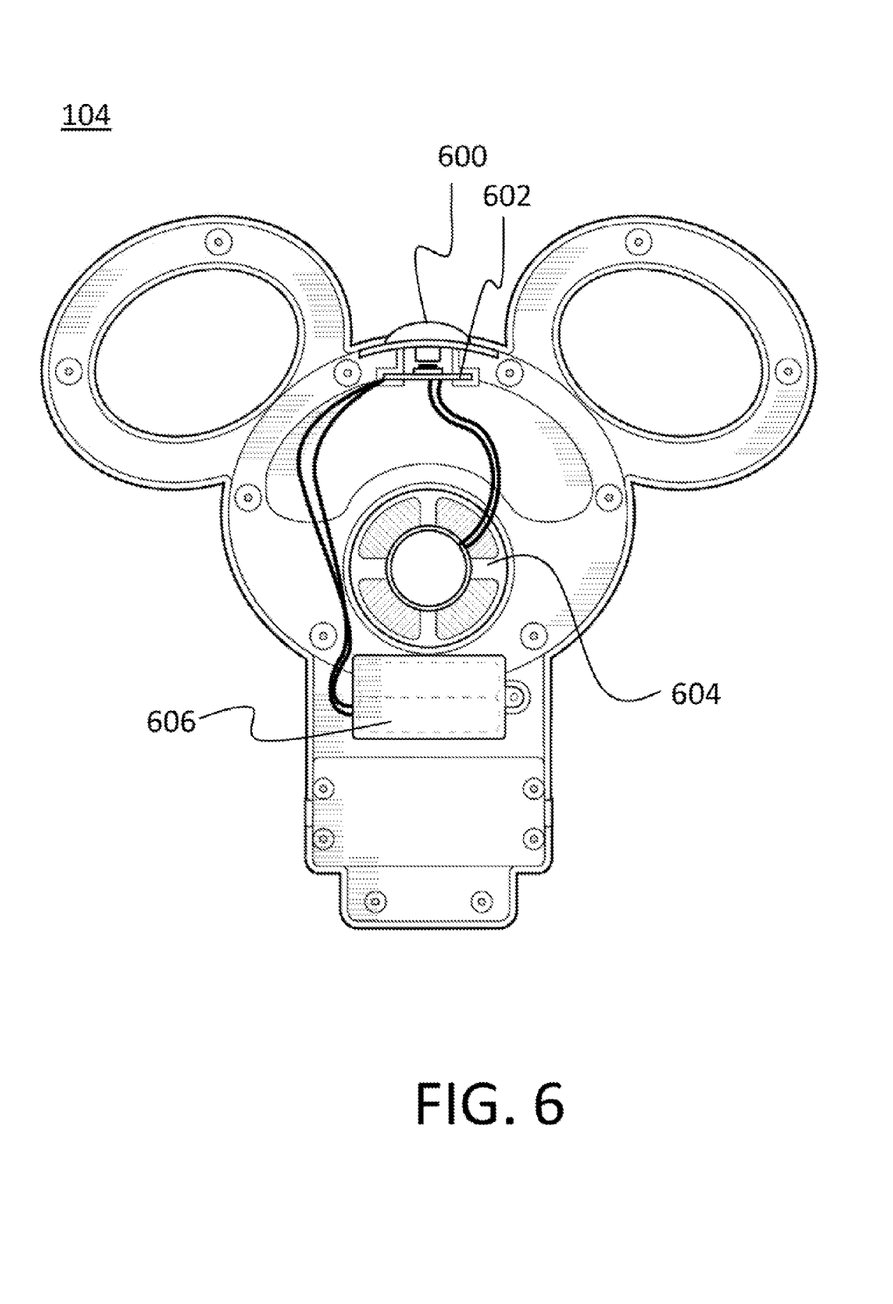
FIG. 6 is an interior-view of the handle, showing a variety of electronic components.

It should be understood that the toy wagon can be formed to include sound and light effects. Thus, the invention includes any suitable mechanism or device to provide a variety of sound and light effects. For example, FIG. 6 is an interior-view illustration of the handle 104, showing a variety of electronic components. As a non-limiting example, the handle 104 houses an electronics activation button 600, a PC board 602, a speaker 604, a battery compartment 606 and any other components necessary to play electronic lights and or sounds.

Thus, as depicted throughout the figures, the present invention is a toy wagon 100 that can effectively and selectively be converted between a ride-on configuration and a pull wagon configuration.

What is claimed is:

1. A convertible ride-on and pull wagon toy, comprising:
    a wagon body, the wagon body including a compartment therein for storage;
    a plurality of wheels rotatably connected with the wagon body for supporting the wagon body on a ground surface;
    an elongated seat member having a wagon end and a handle end, with the elongated seat member being attached with the wagon body such that the wagon end is pivotally connected with the wagon body;
    a handle connected with the handle end of the elongated seat member;
    wherein the elongated seat member is pivotally attached to the wagon body such that the elongated seat member may be rotated between a ride-on configuration where the elongated seat member covers the compartment and operates as a seat, and a pull wagon configuration, where the elongated seat member extends from the wagon and serves as a neck for the handle, whereby through positioning the elongated seat member, a user can selectively convert the ride-on and pull wagon toy between the ride-on configuration and pull wagon configuration;
    wherein the handle is pivotally connected with the handle end of the elongated seat member;
    wherein when the elongated seat member is in the ride-on configuration, the handle pivots up to a ride-on handle position and operates as a ride-on handle, and when the elongated seat member is in the pull wagon configuration, the handle pivots away from the wagon body to operate as a pull wagon handle;
    further comprising a locking mechanism, the locking mechanism adapted to lock the elongated seat member in the ride-on configuration; and
    wherein the locking mechanism includes a pivot member that is pivotally connected with the wagon body, the pivot member having a catch and a handle release, and wherein the handle includes a catch indentation adapted to lock with the catch, whereby when the elongated seat member is rotated into the ride-on configuration, the handle comes to rest against, the wagon body and, in doing so, the catch slides into and locks into place with the catch indentation.

2. A convertible ride-on and pull wagon toy, comprising:
    a wagon body, the wagon body including a compartment therein for storage;
    a plurality of wheels rotatably connected with the wagon body for supporting the wagon body on a ground surface;
    an elongated seat member having a wagon end and a handle end, with the elongated seat member being attached with the wagon body such that the wagon end is pivotally connected with the wagon body;
    a handle connected with the handle end of the elongated seat member;
    wherein the elongated seat member is pivotally attached to the wagon body such that the elongated seat member may be rotated between a ride-on configuration where the elongated seat member covers the compartment and operates as a seat, and a pull wagon configuration, where the elongated seat member extends from the wagon and serves as a neck for the handle, whereby through positioning the elongated seat member, a user can selectively convert the ride-on and pull wagon toy between the ride-on configuration and pull wagon configuration;
    a locking, mechanism, the locking mechanism adapted to lock the elongated seat member in the ride-on configuration; and
    wherein the locking mechanism includes a pivot member that is pivotally connected with the wagon body, the pivot member having, a catch and a handle release, and wherein the handle includes a catch indentation adapted to lock with the catch, whereby when the elongated seat member is rotated into the ride-on configuration, the handle comes to rest against the wagon body and, in doing so, the catch slides into and locks into place with the catch indentation.

* * * * *